United States Patent Office 2,862,893
Patented Dec. 2, 1958

2,862,893

PREPARATION OF STRONGLY BASIC ANION-EXCHANGE RESINS FROM CHLOROHYDRIN ESTERS OF ACRYLIC TYPE ACIDS

Jesse C. H. Hwa, Levittown, Pa., assignor to Rohm & Haas Company, Philadelphia, Pa., a corporation of Delaware No Drawing. Application November 28, 1956
Serial No. 624,743

6 Claims. (Cl. 260—2.1)

This invention relates to the preparation of insoluble anion-exchange resins which are strongly basic. It has particular reference to a new and greatly improved process for preparing strongly basic anion-exchange resins of the type which I have disclosed in U. S. Patent No. 2,630,427, dated March 3, 1953.

This new process has considerable advantages in its actual commercial application over the process disclosed in the said Patent No. 2,630,427. The new method is far simpler, faster, and cheaper to perform than was its predecessor, and is less likely to cause the operator difficulties with the result that much less skill is required to make the resins with my new process than was heretofore necessary. For example, in the former method, which in commercial practice depends almost exclusively on suspension polymerization techniques, there was always a risk that the epoxy group of the glycidyl methacrylate resin would react with the water to form a glycol group which is incapable of being aminated. To avoid this, special skill in handling, controlling temperature, pH, etc. was paramount. By contrast, with the present improvement no such care is necessary because the chlorine atom, which is the reactive member of the chlorohydrin methacrylate resin that features the present invention, does not react with water under these conditions.

The products of this invention are made by reacting a tertiary amine with an insoluble, cross-linked polymer of a monochlorohydrin ester of acrylic acid or of an alpha-substituted acrylic acid such as alpha-methylacrylic acid. Reaction takes place between the chlorine atom of the monochlorohydrin ester and the nitrogen atom of the ammonia compound.

The process can be better understood from a consideration of a preferred embodiment of this invention; namely, the preparation of a quarternary ammonium anion-exchange resin by the reaction of trimethylamine and a cross-linked polymer of the chlorohydrin methacrylate:

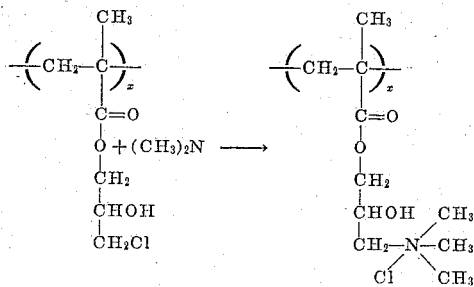

The character $x$ is employed in the conventional way to indicate that the structural unit shown is only one of many such units joined together in the insoluble polymeric chlorohydrin ester.

The scope of the invention is indicated by the following representation:

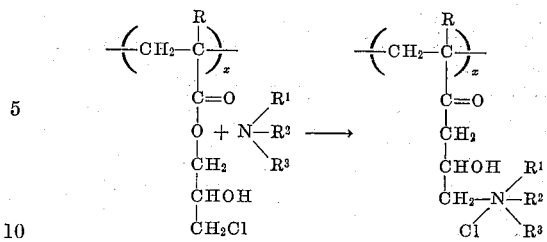

In the above, R represents an atom of hydrogen or an alkyl group of one to four carbon atoms; and $NR^1R^2R^3$ represents a tertiary amine in which $R^1$, $R^2$, and $R^3$ stand for an organic radical. Those amines are preferred in which the organic radicals represented by $R^1$, $R^2$, and $R^3$ are unsubstituted hydrocarbon groups.

It is to be noted that the chlorine atom of the polymeric chlorohydrin ester reacts with the amine during the reaction but that the rest of the macromolecule, including the group R, remains inert and intact. Furthermore, the organic groups attached to the tertiary amino nitrogen atom are not altered; and all that is required of the amine is that it be a tertiary amine, in which case quarternary ammonium groups become attached to the insoluble macromolecule. As a consequence, the product acquires the properties of a strongly basic anion-exchange resin. The chloride anion which is attached to the insoluble resin is capable of exchange with other anions such as $OH^-$, etc. When the resin is converted to the hydroxide form, it acquires the properties of a strongly basic anion-exchange resin which is capable of splitting neutral salt solutions.

The monomeric chlorohydrin esters which are polymerized, cross-linked, and then reacted with a tertiary amine to produce the anion-exchange resins of this invention, include the chlorohydrin esters of acrylic acid, alpha-methylacrylic acid, alpha-ethylacrylic acid, the isomeric alpha-propylacrylic acids, and the isomeric alpha-butyl-acrylic acids. These monomeric esters are known and can conveniently be prepared by reacting a salt of the acid with epichlorohydrin, for example according to the method of U. S. Patent No. 2,335,813 of November 30, 1943. These esters, which it should be understood can be made by methods other than the one disclosed in that patent, can have any one of the following structures:

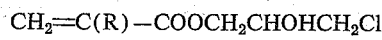

or

or

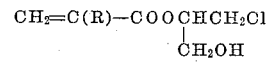

in which structures R represents a member of the class consisting of a hydrogen atom and an alkyl group containing one to four carbon atoms.

The chlorohydrin esters are polymerized together with a cross-linking agent so as to produce insoluble polymeric products. Cross-linking agents are well known and embrace those compounds which are copolymerizable with the chlorohydrin esters and which contain a plurality of non-conjugated vinylidene groups, $CH_2=C<$. Currently, divinylbenzene is the most common cross-linking agent but others which are operable include: divinylpyridine, divinyltoluenes, divinylnaphthalenes, diallyl phthalate, ethylene glycol diacrylate or dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

By varying the amount of the cross-linking agent used in the preparation of the copolymer, variations can be made in the physical properties of the polymeric material which carry through to the finished product. Thus, for example, higher amounts of cross-linker make for products of higher density. In general, the amount of copolymerizable cross-linking agent can vary from 0.1 to 40% of the total polymerizable materials on a molar basis. In practice, however, it is preferred to use at least 0.5%; and for most purposes no benefit is derived from using over about 10%.

The polymeric base material can be formed by any of the known polymerization processes such as polymerization in mass, in solvents for the monomeric materials or in emulsion or suspension in a liquid which is not a solvent for the monomers. The last is the preferred method because it produces the polymer in the form of small spheroids or beads, the size of which can be regulated and controlled.

In following the preferred method it is advantageous to thin out the organic monomer by adding thereto an organic, miscible, inert diluent which is water insoluble as, for example, toluene, benzene, etc. At the end of the polymerization the diluent will be imbibed by the insoluble resin. The resin which contains the diluent is suitable for amination without the prior removal of the diluent.

The polymerization of the chlorohydrin ester and the copolymerizable cross-linking agent is accelerated by means of well known catalysts. These catalysts include ozen; ozonides; organic peroxidic compounds such as acetyl peroxide, lauroyl peroxide, stearoyl peroxide, tert-butyl hydroperoxide, benzoyl peroxide, tert-butylperbenzoate, ditert-butyl diperphthalate, ditert-butyl peroxide, and the barium salt of tert-butyl hydroperoxide; inorganic agents such as barium peroxide, sodium peroxide, hydrogen peroxide; azo compounds such as azobisobutyronitrile; and the so-called "per salts" such as the water-soluble perborates, persulfates, and perchlorates. The catalysts are employed in suitable amounts ranging from 0.1 to about 2% based on the weight of the monomeric material to be polymerized.

Tertiary amines which react with the cross-linked and insoluble chlorohydrin esters are best represented, as above, by the general formula:

in which $R^1$, $R^2$, and $R^3$ represent organic radicals. Those amines are preferred in which the organic groups attached to the nitrogen atoms are unsubstituted hydrocarbon groups. But it is also true that other amines can be used wherein the hydrocarbon radical of the amine carries a substituent group, such as a hydroxyl group, as in N,N-dimethylethanolamine. The portions of the tertiary amines which are represented by $R^1$, $R^2$, and $R^3$ above can be aliphatic, aromatic cycloaliphatic, araliphatic, and alkaromatic. These groups are not altered during the reaction of the amine with the polymeric chlorohydrin ester. The stability on long continued use of the final, insoluble, quaternary ammonium resin in actual commercial use is somewhat dependent upon the particular radicals which are present in the reacted tertiary amine and which are, therefore, present in the final product. The most stable products are those in which the substituents on the nitrogen atom are methyl, benzyl, and phenyl groups. The beta-hydroxyethyl group is also a much preferred group. The most satisfactory tertiary amines which are employed, therefore, are typified by the following: trimethylamine, dimethylbenzylamine, dibenzylmethylamine, dimethylaniline, benzylphenylmethylamine, N,N-dimethylethanolamine, N-methyldiethanolamine, and triethanolamine.

In place of the tertiary amines described above, it is possible to use other amines such as ammonia, primary and secondary amines in which case anion-exchange resins of quite different characteristics will be obtained, as disclosed in my co-pending application for Letters Patent, Serial No. 624,742, filed November 28, 1956. It is also possible to use polyamines, at least one of which amines is a tertiary amino group, in which case anion-exchange resins of still different characteristics will be obtained, as disclosed in my co-pending application for Letters Patent, Serial No. 624,744, filed November 28, 1956.

The reaction of the amine and the polymeric chlorohydrin ester is best carried out as follows: Particles of the insoluble resin (which can contain some of the inert diluent if such a material was employed as described above) are suspended by agitation in a liquid which is a solvent for the amine, such as water or an alcohol, dioxane, toluene or the like, and then agitating the reaction mixture while it is maintained at a temperature from about 0° C. to the refluxing temperature. Since, however, the process is decidedly less efficient at the lower temperatures, it is much preferred to employ a temperature from about 50° C. to the boiling point of the reaction mixtures.

While a catalyst is not necessary, it is nevertheless suggested that one be employed. Catalysts which are recommended include iodides of alkali metals such as sodium iodide, potassium iodide, etc.

When the reaction is complete, the resinous product containing quaternary ammonium groups is separated from the reaction mixture as, for example, by steam distillation, decantation, or filtration, and is washed free of contaminants.

The following examples, in which all parts are by weight, serve to illustrate the process of this invention which in its broader aspects is a novel method of converting insoluble, cross-linked polymers of chlorohydrin esters of acrylic and alpha-substituted acrylic acids into anion-exchange resins containing quaternary ammonium group as polar, anion-adsorbing groups.

Example 1

(a) Into a container equipped with thermometer, mechanical stirrer, and reflux condenser were poured 3000 parts of water containing 0.5% of a commercial dispersing agent. To this stirred solution was added a mixture of 1450 parts of monomeric 3-chloro-2-hydroxypropyl methacrylate, 30 parts of divinylbenzene, 22 parts of ethyl styrene and 15 parts of benzoyl peroxide. The mixture was stirred for ten minutes at 40° to 50° C. after which it was heated to 80° to 85° C. and held there for five hours. The mixture was then filtered; the hardened, insoluble beads of polymeric, cross-linked 3-chloro-2-hydroxypropyl methacrylate were washed thoroughly first with water and then with ethanol. After drying at 105° C. for five hours, the beads were uniform, individual, and hard and had an average estimated size of 0.2 mm. diameter. The yield of the dry product was 1375 parts, corresponding to 91.5% of the theoretical. The beads had 17.1% chlorine by analysis. The described process is also suitable for the preparation of insoluble, cross-linked polymers of all the chlorohydrin esters described above.

(b) In a similar manner a monomer mixture consisting of 669 parts of 3-chloro-2-hydroxypropyl methacrylate, 31 parts of ethylene glycol dimethacrylate, 7 parts of benzoyl peroxide, and 300 parts of toluene was converted to toluene-swollen insoluble beads by suspension polymerization in 2500 parts of water. After thorough washing with water, the spherical beads still retained the imbibed toluene solvent and could be used without drying. The toluene-laden, water wet resin contained 48.4% solids.

Example 2

(a) Into a container equipped with thermometer, reflux condenser and agitator were added 73.5 parts of the resin obtained by the method of Example 1(a), and 75 parts of water. The mixture was stirred and maintained at 40° C. To the mixture 75 part portions of successive 5, 10, 25, 50, and 100% aqueous dimethylformamide solutions were added at ten minute intervals. The mixture was heated to 50° C. for one hour and 200 parts of the liquid phase was removed by siphoning. 150 parts of dimethylformamide was added to the remaining mixture and the contents were heated to 50° C. for one more hour. After the mixture was allowed to cool down to room temperature, 16 parts of trimethylamine gas was condensed in the reaction mixture at 25° to 35° C. 0.5 parts of sodium iodide was also added and the reaction mixture was stirred at 30° to 40° C. for two hours and at 40° to 45° C. for four more hours. The mixture was then filtered and the hydrophilic, swollen beads were thoroughly rinsed with water.

The product, after being drained from excess interstitial water, weighed 234 parts and contained 11.9% chlorine and 4.2% nitrogen on a dry weight basis. The product, typical of quaternary ammonium ion-exchange resins, is capable of splitting neutral salt solutions. The pertinent ion-exchange data are: 61.1% moisture, 0.625 g./ml. density, 2.39 milliequivalents per gram dry and 0.58 milliequivalent per milliliter wet of salt splitting anion capacity. (The salt splitting capacity was measured after converting the original product, which was in the chloride form, to the hydroxide form by treatment with excess 0.1 N sodium hydroxide and rinsing the excess caustic off with alcohol.)

(b) An identical experiment without using sodium iodide gave similar results.

Example 3

(a) In similar equipment as described in Example 2, 100 parts of the resin prepared by the method described in Example 1(a), 290 parts of water and 20.6 parts of trimethylamine were stirred at 45° to 50° C. for three hours. The toluene contained in the starting material was removed by steam distillation and the resin was thoroughly rinsed with water. The product had 33% solids, 10.9% chlorine, and 4.7% nitrogen (on a dry weight basis) and more than 2 milliequivalents per gram dry of salt splitting anion capacity.

(b) In like manner the toluene-swollen, 3-chloro-2-hydroxypropyl methacrylate-ethylene glycol dimethacrylate beads were reacted with excess dimethylethanolamine, and the resulting product was found to have more than 1.5 milliequivalents per gram dry of salt splitting anion capacity.

(c) In like manner the toluene-swollen 3-chloro-2-hydroxypropyl methacrylate-ethylene glycol dimethacrylate beads were reacted with dimethylbenzylamine and the resulting product was found to have 1.1 milliequivalents per gram dry of salt splitting anion-exchange capacity.

I claim:

1. A process for preparing strongly basic anion-exchange resins containing polar quaternary ammonium groups which comprises reacting a tertiary amine from the class consisting of trimethylamine, dimethylbenzylamine, dibenzylmethylamine, dimethylaniline, benzylphenylmethylamine, N,N-dimethylethanolamine, N-methyldiethanolamine, and triethanolamine together with an insoluble, cross-linked, resinous product which is a copolymer of a mixture containing (a) 90 to 99.5% of a chlorohydrin ester which is one of the class of compounds designated by the following formulae:

$$CH_2=C(R)-COOCH_2CHClCH_2OH$$

and $CH_2=C(R)-COOCH_2CHOHCH_2Cl$ in which R represents a member of the class consisting of a hydrogen atom and an alkyl group containing one to four carbon atoms, and (b) 0.5 to 10% of a compound which is copolymerizable with said ester and which contains at least two non-conjugated vinylidene groups, $CH_2=C<$.

2. A process for preparing strongly basic anion-exchange resins containing polar quaternary ammonium groups which comprises reacting trimethylamine with an insoluble, cross-linked, resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2,-di-(α-methylmethylene sulfonamido)-ethylene, trivinylbenzene, trivinylnaphthalene, and polyvinylanthracenes.

3. A process for preparing strongly basic anion-exchange resins containing polar quaternary ammonium groups which comprises reacting N,N-dimethylethanolamine with an insoluble, cross-linked resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacrylamide, N,N'-ethylenediacrylamide, 1,2 - di - (α - methylmethylene sulfonamido)-ethylene, trivinylbenzene, trivinylnaphthalene, and polyvinylanthracenes.

4. A process for preparing strongly basic anion-exchange resins containing polar quaternary ammonium groups which comprises reacting trimethylamine with an insoluble, cross-linked, resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

5. A process for preparing strongly basic anion-exchange resins containing polar quaternary ammonium groups which comprises reacting N,N'-dimethylethanolamine with an insoluble, cross-linked, resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

6. A process for preparing strongly basic anion-exchange resins containing polar quaternary ammonium groups which comprises reacting dimethylbenzylamine with an insoluble, cross-linked, resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacrylamide, N,N' - ethylenediacrylamide, 1,2 - di-(α-methylmethylene sulfonamido)-ethylene, trivinylbenzene, trivinylnaphthalene, and polyvinylanthracenes.

References Cited in the file of this patent
UNITED STATES PATENTS

| | | |
|---|---|---|
| 1,860,098 | Jaeger | May 24, 1932 |
| 1,977,251 | Stallman | Oct. 16, 1934 |
| 2,129,694 | Izzard | Sept. 13, 1938 |
| 2,630,427 | Hwa | Mar. 3, 1953 |